(12) United States Patent
Mountain

(10) Patent No.: US 9,652,108 B2
(45) Date of Patent: May 16, 2017

(54) PROGRESS BAR

(75) Inventor: Dale Llewelyn Mountain, Silsden (GB)

(73) Assignee: ECHOSTAR UK HOLDINGS LIMITED, Steeton (GB)

( * ) Notice: Subject to any disclaimer, the term of this patent is extended or adjusted under 35 U.S.C. 154(b) by 0 days.

(21) Appl. No.: 13/475,794

(22) Filed: May 18, 2012

(65) Prior Publication Data

US 2012/0293327 A1 Nov. 22, 2012

(30) Foreign Application Priority Data

May 20, 2011 (EP) .................................... 11166848

(51) Int. Cl.
| | | |
|---|---|---|
| *G08B 21/00* | (2006.01) | |
| *G06F 3/0481* | (2013.01) | |
| *H04N 5/445* | (2011.01) | |
| *H04N 21/442* | (2011.01) | |
| *H04N 21/488* | (2011.01) | |

(52) U.S. Cl.
CPC ....... *G06F 3/0481* (2013.01); *H04N 5/44513* (2013.01); *H04N 21/44209* (2013.01); *H04N 21/44245* (2013.01); *H04N 21/4882* (2013.01); *H04N 2005/44517* (2013.01)

(58) Field of Classification Search
None
See application file for complete search history.

(56) References Cited

U.S. PATENT DOCUMENTS

| | | |
|---|---|---|
| 4,809,325 A | 2/1989 | Hayashi et al. |
| 4,837,414 A | 6/1989 | Edamula |
| 5,500,681 A | 3/1996 | Jones |
| 5,510,603 A | 4/1996 | Hess et al. |
| 5,581,636 A | 12/1996 | Skinger |
| 5,602,377 A | 2/1997 | Beller et al. |

(Continued)

FOREIGN PATENT DOCUMENTS

| | | |
|---|---|---|
| CA | 2 634 951 A1 | 1/2010 |
| CN | 1352765 A | 6/2002 |

(Continued)

OTHER PUBLICATIONS

Extended European Search Report for EP 11166848.9 dated Nov. 16, 2011, 10 pages.

(Continued)

*Primary Examiner* — Curtis King
(74) *Attorney, Agent, or Firm* — Kilpatrick Townsend & Stockton LLP

(57) ABSTRACT

A method for displaying the progress of an activity performed on a user device is provided. The method includes outputting a progress indicator indicative of the progress made in completing an activity and updating the progress indicator as the activity proceeds. Simultaneously, a first progress rate indicator is also output to the display, the progress rate indicator having a property indicative of the rate at which the activity is being progressed. The property of the progress rate indicator is based on a value determined by receiving a rate value indicative of the activity progress rate and comparing the rate value with a value indicative of the maximum progress rate of the user device for the particular activity. A corresponding apparatus and computer program for carrying out the method are also provided.

19 Claims, 5 Drawing Sheets

(56) References Cited

U.S. PATENT DOCUMENTS

| | | |
|---|---|---|
| 5,703,349 A | 12/1997 | Meyerson et al. |
| 5,929,849 A | 7/1999 | Kikinis |
| 5,959,285 A | 9/1999 | Schuessler |
| 5,963,265 A | 10/1999 | Bae et al. |
| 5,978,855 A | 11/1999 | Metz et al. |
| 6,006,990 A | 12/1999 | Ye et al. |
| 6,058,238 A | 5/2000 | Ng |
| 6,263,502 B1 | 7/2001 | Morrison et al. |
| 6,438,751 B1 | 8/2002 | Voyticky et al. |
| 6,512,919 B2 | 1/2003 | Ogasawara |
| 6,556,273 B1 | 4/2003 | Wheeler et al. |
| 6,704,929 B1 | 3/2004 | Ozer et al. |
| 6,766,956 B1 | 7/2004 | Boylan et al. |
| 6,983,304 B2 | 1/2006 | Sato |
| 7,046,161 B2 | 5/2006 | Hayes |
| 7,206,029 B2 | 4/2007 | Cohen-Solal |
| 7,206,409 B2 | 4/2007 | Antonellis et al. |
| 7,221,405 B2 | 5/2007 | Basson et al. |
| 7,244,404 B2 | 7/2007 | Rosenberg et al. |
| 7,328,848 B2 | 2/2008 | Xia et al. |
| 7,349,668 B2 | 3/2008 | Ilan et al. |
| 7,369,180 B2 | 5/2008 | Xing |
| 7,373,652 B1 | 5/2008 | Bayrakeri et al. |
| 7,387,250 B2 | 6/2008 | Muni |
| 7,394,519 B1 | 7/2008 | Mossman et al. |
| 7,424,976 B2 | 9/2008 | Muramatsu |
| 7,443,449 B2 | 10/2008 | Momosaki et al. |
| 7,487,527 B2 | 2/2009 | Ellis et al. |
| 7,587,601 B2 | 9/2009 | Levy et al. |
| 7,604,172 B2 | 10/2009 | Onogi |
| 7,612,748 B2 | 11/2009 | Tateuchi |
| 7,624,417 B2 | 11/2009 | Dua |
| 7,624,916 B2 | 12/2009 | Sato et al. |
| 7,673,297 B1 | 3/2010 | Arsenault et al. |
| 7,797,430 B2 | 9/2010 | Ichieda |
| 7,818,675 B2 | 10/2010 | Maruyama et al. |
| 7,841,531 B2 | 11/2010 | Onogi |
| 8,010,977 B2 | 8/2011 | Hogyoku |
| 8,045,054 B2 | 10/2011 | Bishop et al. |
| 8,186,572 B2 | 5/2012 | Herzig |
| 8,292,166 B2 | 10/2012 | Gomez et al. |
| 8,364,018 B2 | 1/2013 | McArdle |
| 8,380,993 B2 | 2/2013 | Chen et al. |
| 8,386,339 B2 | 2/2013 | Minnick et al. |
| 8,408,466 B2 | 4/2013 | Gratton |
| 8,427,455 B2 | 4/2013 | Matsuda |
| 8,430,302 B2 | 4/2013 | Minnick et al. |
| 8,439,257 B2 | 5/2013 | Beals et al. |
| 8,443,407 B2 | 5/2013 | Gaede et al. |
| 8,468,610 B2 | 6/2013 | Beals et al. |
| 8,511,540 B2 | 8/2013 | Anguiano |
| 8,534,540 B2 | 9/2013 | Gratton et al. |
| 8,550,334 B2 | 10/2013 | Gratton et al. |
| 8,553,146 B2 | 10/2013 | Kennedy |
| 8,746,554 B2 | 6/2014 | Gomez et al. |
| 8,786,410 B2 | 7/2014 | Beals et al. |
| 8,827,150 B2 | 9/2014 | Gratton et al. |
| 8,833,640 B2 | 9/2014 | Martch et al. |
| 8,856,853 B2 | 10/2014 | Casagrande et al. |
| 8,875,173 B2 | 10/2014 | Kilaru et al. |
| 8,886,172 B2 | 11/2014 | Gomez |
| 8,931,031 B2 | 1/2015 | Schaefer |
| 9,092,830 B2 | 7/2015 | Gomez et al. |
| 9,148,686 B2 | 9/2015 | Gerhards et al. |
| 9,280,515 B2 | 3/2016 | Gaede et al. |
| 9,329,966 B2 | 5/2016 | Dugan et al. |
| 9,367,669 B2 | 6/2016 | Gratton |
| 2001/0037297 A1 | 11/2001 | McNair |
| 2001/0052133 A1 | 12/2001 | Pack et al. |
| 2002/0011521 A1 | 1/2002 | Lahey et al. |
| 2002/0027612 A1 | 3/2002 | Brill et al. |
| 2002/0049980 A1 | 4/2002 | Hoang |
| 2002/0065728 A1 | 5/2002 | Ogasawara |
| 2002/0112250 A1 | 8/2002 | Koplar et al. |
| 2002/0195495 A1 | 12/2002 | Melick et al. |
| 2003/0018711 A1 | 1/2003 | Imanishi |
| 2003/0050854 A1 | 3/2003 | Showghi et al. |
| 2003/0077065 A1 | 4/2003 | Scholten et al. |
| 2003/0112974 A1 | 6/2003 | Levy |
| 2003/0121978 A1 | 7/2003 | Rubin et al. |
| 2003/0125092 A1* | 7/2003 | Burnhouse ........ H04M 1/72522 455/566 |
| 2003/0151562 A1 | 8/2003 | Kulas |
| 2003/0172374 A1 | 9/2003 | Vinson et al. |
| 2004/0005900 A1 | 1/2004 | Zilliacus |
| 2004/0019691 A1 | 1/2004 | Daymond et al. |
| 2004/0026508 A1 | 2/2004 | Nakajima et al. |
| 2004/0044532 A1 | 3/2004 | Karstens |
| 2004/0046790 A1* | 3/2004 | Agarwal et al. ............. 345/748 |
| 2004/0049672 A1 | 3/2004 | Nollet et al. |
| 2004/0260850 A1* | 12/2004 | Yu ........................ G06F 13/385 710/104 |
| 2005/0009564 A1 | 1/2005 | Hayaashi et al. |
| 2005/0011958 A1 | 1/2005 | Fukasawa et al. |
| 2005/0015800 A1 | 1/2005 | Holcomb |
| 2005/0015815 A1 | 1/2005 | Shoff et al. |
| 2005/0055281 A1 | 3/2005 | Williams |
| 2005/0059339 A1 | 3/2005 | Honda et al. |
| 2005/0097618 A1 | 5/2005 | Arling et al. |
| 2005/0107135 A1* | 5/2005 | Deeds et al. ................ 455/575.1 |
| 2005/0125301 A1 | 6/2005 | Muni |
| 2005/0149967 A1 | 7/2005 | Hanley et al. |
| 2005/0163483 A1 | 7/2005 | Rassool |
| 2005/0180804 A1 | 8/2005 | Andrew et al. |
| 2005/0203854 A1 | 9/2005 | Das |
| 2005/0258250 A1 | 11/2005 | Melick et al. |
| 2005/0262548 A1 | 11/2005 | Shimojo et al. |
| 2005/0264694 A1 | 12/2005 | Ilan et al. |
| 2006/0064700 A1 | 3/2006 | Ludvig et al. |
| 2006/0065733 A1 | 3/2006 | Lee et al. |
| 2006/0071076 A1 | 4/2006 | Tamayama |
| 2006/0079247 A1 | 4/2006 | Ritter |
| 2006/0086796 A1 | 4/2006 | Onogi |
| 2006/0090179 A1 | 4/2006 | Hsu et al. |
| 2006/0095286 A1 | 5/2006 | Kimura |
| 2006/0124742 A1 | 6/2006 | Rines et al. |
| 2006/0174317 A1 | 8/2006 | Onomatsu et al. |
| 2006/0196950 A1 | 9/2006 | Kiliccote |
| 2006/0203339 A1 | 9/2006 | Kleinberger et al. |
| 2006/0208088 A1 | 9/2006 | Sekiguchi |
| 2006/0265731 A1 | 11/2006 | Matsuda |
| 2007/0008344 A1 | 1/2007 | Medina |
| 2007/0011709 A1 | 1/2007 | Katz et al. |
| 2007/0016934 A1 | 1/2007 | Okada et al. |
| 2007/0016936 A1 | 1/2007 | Okada et al. |
| 2007/0017350 A1 | 1/2007 | Uehara |
| 2007/0019215 A1 | 1/2007 | Yu |
| 2007/0063050 A1 | 3/2007 | Attia et al. |
| 2007/0073585 A1 | 3/2007 | Apple et al. |
| 2007/0143788 A1 | 6/2007 | Abernathy et al. |
| 2007/0159522 A1 | 7/2007 | Neven |
| 2007/0174198 A1 | 7/2007 | Kasahara |
| 2007/0192723 A1 | 8/2007 | Anzelde et al. |
| 2007/0200335 A1 | 8/2007 | Tushcel et al. |
| 2007/0206020 A1 | 9/2007 | Duffield et al. |
| 2007/0256118 A1 | 11/2007 | Nomura et al. |
| 2007/0288594 A1 | 12/2007 | Philyaw et al. |
| 2008/0022323 A1 | 1/2008 | Koo |
| 2008/0059998 A1 | 3/2008 | McClenny et al. |
| 2008/0062164 A1 | 3/2008 | Bassi et al. |
| 2008/0073434 A1 | 3/2008 | Epshteyn et al. |
| 2008/0077324 A1 | 3/2008 | Hatano et al. |
| 2008/0082684 A1 | 4/2008 | Gaos et al. |
| 2008/0092154 A1 | 4/2008 | Hogyoku |
| 2008/0112615 A1 | 5/2008 | Obrea et al. |
| 2008/0156879 A1 | 7/2008 | Melick et al. |
| 2008/0182561 A1 | 7/2008 | Kim et al. |
| 2008/0189185 A1 | 8/2008 | Matsuo et al. |
| 2008/0200153 A1 | 8/2008 | Fitzpatrick et al. |
| 2008/0200160 A1 | 8/2008 | Fitzpatrick et al. |
| 2008/0201078 A1 | 8/2008 | Fitzpatrick et al. |
| 2008/0244675 A1 | 10/2008 | Sako et al. |
| 2008/0263621 A1 | 10/2008 | Austerlitz et al. |
| 2008/0267537 A1 | 10/2008 | Thuries |

(56) References Cited

U.S. PATENT DOCUMENTS

| | | |
|---|---|---|
| 2008/0281624 A1 | 11/2008 | Shibata |
| 2008/0288460 A1 | 11/2008 | Poniatowski et al. |
| 2008/0288600 A1 | 11/2008 | Clark |
| 2008/0307348 A1* | 12/2008 | Jones et al. .............. 715/772 |
| 2009/0029725 A1 | 1/2009 | Kindberg |
| 2009/0031071 A1 | 1/2009 | Chiu |
| 2009/0031373 A1 | 1/2009 | Hogyoku |
| 2009/0070699 A1* | 3/2009 | Birkill et al. .............. 715/772 |
| 2009/0083808 A1 | 3/2009 | Morrison |
| 2009/0088213 A1 | 4/2009 | Rofougaran |
| 2009/0094546 A1* | 4/2009 | Anzelde et al. .............. 715/772 |
| 2009/0108057 A1 | 4/2009 | Mu et al. |
| 2009/0113334 A1* | 4/2009 | Chakra et al. .............. 715/772 |
| 2009/0116074 A1 | 5/2009 | Wilsher |
| 2009/0154759 A1 | 6/2009 | Koskinen et al. |
| 2009/0157511 A1 | 6/2009 | Spinnell et al. |
| 2009/0157530 A1 | 6/2009 | Nagamoto et al. |
| 2009/0172780 A1 | 7/2009 | Sukeda et al. |
| 2009/0179852 A1 | 7/2009 | Refai et al. |
| 2009/0180025 A1 | 7/2009 | Dawson |
| 2009/0196456 A1 | 8/2009 | Bisti et al. |
| 2009/0200367 A1 | 8/2009 | Arnouse |
| 2009/0212112 A1 | 8/2009 | Li et al. |
| 2009/0212113 A1 | 8/2009 | Chiu et al. |
| 2009/0234570 A1 | 9/2009 | Sever |
| 2009/0250512 A1 | 10/2009 | Deck et al. |
| 2009/0254954 A1 | 10/2009 | Jeong |
| 2009/0293088 A1 | 11/2009 | Mukerji et al. |
| 2009/0293110 A1 | 11/2009 | Koga |
| 2009/0294538 A1 | 12/2009 | Wihlborg et al. |
| 2009/0300673 A1* | 12/2009 | Bachet .............. H04N 7/17318 725/31 |
| 2009/0303036 A1 | 12/2009 | Sahuguet |
| 2009/0307232 A1 | 12/2009 | Hall |
| 2009/0307719 A1 | 12/2009 | Clark et al. |
| 2009/0312105 A1 | 12/2009 | Koplar |
| 2009/0320066 A1 | 12/2009 | Soldan et al. |
| 2010/0001072 A1 | 1/2010 | Onogi |
| 2010/0017457 A1 | 1/2010 | Jumpertz et al. |
| 2010/0020970 A1 | 1/2010 | Liu et al. |
| 2010/0026721 A1 | 2/2010 | Park et al. |
| 2010/0031162 A1 | 2/2010 | Wiser et al. |
| 2010/0036936 A1 | 2/2010 | Cox et al. |
| 2010/0053339 A1 | 3/2010 | Aaron et al. |
| 2010/0081375 A1 | 4/2010 | Rosenblatt et al. |
| 2010/0089996 A1 | 4/2010 | Koplar |
| 2010/0096448 A1 | 4/2010 | Melick et al. |
| 2010/0103018 A1 | 4/2010 | Yoon et al. |
| 2010/0114715 A1 | 5/2010 | Schuster et al. |
| 2010/0129057 A1 | 5/2010 | Kulkarni |
| 2010/0131373 A1 | 5/2010 | Kubasov |
| 2010/0131900 A1 | 5/2010 | Spetalnick |
| 2010/0131970 A1 | 5/2010 | Falcon |
| 2010/0131983 A1 | 5/2010 | Shannon et al. |
| 2010/0138344 A1 | 6/2010 | Wong |
| 2010/0149187 A1 | 6/2010 | Slavin et al. |
| 2010/0154035 A1 | 6/2010 | Damola et al. |
| 2010/0161437 A1 | 6/2010 | Pandey |
| 2010/0163613 A1 | 7/2010 | Bucher et al. |
| 2010/0169935 A1 | 7/2010 | Abbruzzese |
| 2010/0188514 A1 | 7/2010 | Sato et al. |
| 2010/0201894 A1 | 8/2010 | Nakayama et al. |
| 2010/0205628 A1 | 8/2010 | Davis et al. |
| 2010/0217663 A1 | 8/2010 | Ramer et al. |
| 2010/0225653 A1 | 9/2010 | Sao et al. |
| 2010/0261454 A1 | 10/2010 | Shenfield et al. |
| 2010/0262924 A1 | 10/2010 | Kalu |
| 2010/0262992 A1 | 10/2010 | Casagrande |
| 2010/0272193 A1 | 10/2010 | Khan et al. |
| 2010/0272420 A1 | 10/2010 | Soohoo et al. |
| 2010/0275010 A1 | 10/2010 | Ghirardi |
| 2010/0279710 A1 | 11/2010 | Dicke et al. |
| 2010/0295868 A1 | 11/2010 | Zahnert et al. |
| 2010/0301115 A1 | 12/2010 | Berkun |
| 2010/0313231 A1 | 12/2010 | Okamoto et al. |
| 2010/0319041 A1 | 12/2010 | Ellis |
| 2010/0327060 A1 | 12/2010 | Moran et al. |
| 2011/0000958 A1 | 1/2011 | Herzig |
| 2011/0007630 A1* | 1/2011 | Almhana et al. .............. 370/230 |
| 2011/0030068 A1 | 2/2011 | Imai |
| 2011/0039573 A1 | 2/2011 | Hardie |
| 2011/0058516 A1 | 3/2011 | Small et al. |
| 2011/0061003 A1 | 3/2011 | Miyazawa et al. |
| 2011/0065451 A1 | 3/2011 | Danado et al. |
| 2011/0087539 A1 | 4/2011 | Rubinstein et al. |
| 2011/0107374 A1 | 5/2011 | Roberts et al. |
| 2011/0107386 A1 | 5/2011 | De Los Reyes et al. |
| 2011/0138408 A1 | 6/2011 | Adimatyam et al. |
| 2011/0208710 A1 | 8/2011 | Lesavich |
| 2011/0258058 A1 | 10/2011 | Carroll et al. |
| 2011/0264527 A1 | 10/2011 | Fitzpatrick et al. |
| 2011/0264530 A1 | 10/2011 | Santangelo et al. |
| 2011/0282727 A1 | 11/2011 | Phan et al. |
| 2011/0296046 A1* | 12/2011 | Arya .............. H04L 65/80 709/231 |
| 2011/0314485 A1 | 12/2011 | Abed |
| 2011/0321114 A1 | 12/2011 | Newell |
| 2012/0075529 A1 | 3/2012 | Wong et al. |
| 2012/0084206 A1 | 4/2012 | Mehew et al. |
| 2012/0096499 A1 | 4/2012 | Dasher et al. |
| 2012/0117232 A1 | 5/2012 | Brown et al. |
| 2012/0127110 A1 | 5/2012 | Amm et al. |
| 2012/0128267 A1 | 5/2012 | Dugan et al. |
| 2012/0130835 A1 | 5/2012 | Fan et al. |
| 2012/0130851 A1 | 5/2012 | Minnick et al. |
| 2012/0131416 A1 | 5/2012 | Dugan et al. |
| 2012/0137318 A1 | 5/2012 | Kilaru et al. |
| 2012/0138671 A1 | 6/2012 | Gaede et al. |
| 2012/0139826 A1 | 6/2012 | Beals et al. |
| 2012/0139835 A1 | 6/2012 | Morrison et al. |
| 2012/0142322 A1 | 6/2012 | Gomez |
| 2012/0151293 A1 | 6/2012 | Beals |
| 2012/0151524 A1 | 6/2012 | Kilaru et al. |
| 2012/0153015 A1 | 6/2012 | Gomez et al. |
| 2012/0153017 A1 | 6/2012 | Bracalente et al. |
| 2012/0155838 A1 | 6/2012 | Gerhards et al. |
| 2012/0158919 A1 | 6/2012 | Aggarwal et al. |
| 2012/0159563 A1 | 6/2012 | Gomez et al. |
| 2012/0168493 A1 | 7/2012 | Worms |
| 2012/0168510 A1 | 7/2012 | Gratton |
| 2012/0169928 A1 | 7/2012 | Casagrande et al. |
| 2012/0175416 A1 | 7/2012 | Gomez et al. |
| 2012/0181329 A1 | 7/2012 | Gratton et al. |
| 2012/0182320 A1 | 7/2012 | Beals et al. |
| 2012/0188112 A1 | 7/2012 | Beals et al. |
| 2012/0188442 A1 | 7/2012 | Kennedy |
| 2012/0198572 A1 | 8/2012 | Beals et al. |
| 2012/0199643 A1 | 8/2012 | Minnick et al. |
| 2012/0206648 A1 | 8/2012 | Casagrande et al. |
| 2012/0215830 A1 | 8/2012 | Anguiano |
| 2012/0217292 A1 | 8/2012 | Gratton et al. |
| 2012/0217293 A1 | 8/2012 | Martch et al. |
| 2012/0218470 A1 | 8/2012 | Schaefer |
| 2012/0218471 A1 | 8/2012 | Gratton |
| 2012/0222055 A1 | 8/2012 | Schaefer et al. |
| 2012/0222071 A1 | 8/2012 | Gaede et al. |
| 2012/0222081 A1 | 8/2012 | Schaefer et al. |
| 2012/0311623 A1 | 12/2012 | Davis et al. |
| 2013/0068838 A1 | 3/2013 | Gomez et al. |
| 2013/0239157 A1 | 9/2013 | Gaede et al. |
| 2014/0046661 A1 | 2/2014 | Bruner |
| 2014/0076963 A1 | 3/2014 | Gratton et al. |
| 2014/0158762 A1 | 6/2014 | Gomez et al. |
| 2016/0066050 A1 | 3/2016 | Gerhards et al. |

FOREIGN PATENT DOCUMENTS

| | | |
|---|---|---|
| CN | 1571503 A | 1/2005 |
| CN | 1636371 A | 7/2005 |
| CN | 1675930 A | 9/2005 |
| CN | 1839398 A | 9/2006 |
| CN | 101 227 581 A | 7/2008 |
| CN | 101253504 A | 8/2008 |
| CN | 101 355 685 A | 1/2009 |

(56) References Cited

FOREIGN PATENT DOCUMENTS

| | | |
|---|---|---|
| CN | 101 409 027 A | 4/2009 |
| CN | 101 873 467 A | 10/2010 |
| CN | 101 894 113 A | 11/2010 |
| CN | 101 895 722 A | 11/2010 |
| DE | 23 36 711 A1 | 2/1975 |
| DE | 10 2007 038 810 A1 | 2/2009 |
| EP | 1 021 035 A1 | 7/2000 |
| EP | 1 383 071 A2 | 1/2004 |
| EP | 1 555 808 A1 | 7/2005 |
| EP | 1 724 695 A1 | 11/2006 |
| EP | 1 757 222 A1 | 2/2007 |
| EP | 1 768 400 A2 | 3/2007 |
| EP | 2 079 051 A1 | 7/2009 |
| EP | 2 131 289 A1 | 12/2009 |
| EP | 2 439 936 A2 | 4/2012 |
| FR | 2 565 748 A1 | 12/1985 |
| GB | 2 044 446 A | 10/1980 |
| GB | 2 165 129 A | 4/1986 |
| GB | 2 311 451 A | 9/1997 |
| GB | 2 325 765 A | 12/1998 |
| GB | 2 471 567 A | 1/2011 |
| IN | 4698/CHENP/2013 A | 6/2016 |
| IN | 7734/CHENP/2013 A | 6/2016 |
| JP | 2002-215768 A | 8/2002 |
| JP | 2007-213548 A | 8/2007 |
| JP | 2008-244556 A | 10/2008 |
| JP | 2009-140204 A | 6/2009 |
| KR | WO 0241656 A1 * | 5/2002 ......... G06Q 30/0267 |
| KR | 2004 0087776 A | 10/2004 |
| TW | 299433 | 3/1997 |
| TW | 200915193 A1 | 4/2009 |
| TW | 200926075 A | 6/2009 |
| TW | 201032139 A | 1/2010 |
| TW | 201038061 | 10/2010 |
| TW | 201043039 A1 | 12/2010 |
| WO | 95/27275 A1 | 10/1995 |
| WO | 97/41690 A1 | 11/1997 |
| WO | 01/06593 A2 | 1/2001 |
| WO | 01/18589 A1 | 3/2001 |
| WO | 01/58146 A2 | 8/2001 |
| WO | 2004/019442 A2 | 3/2004 |
| WO | 2005/109338 A1 | 11/2005 |
| WO | 2007/009005 A1 | 1/2007 |
| WO | 2009/056897 A1 | 5/2009 |
| WO | 2009/057651 A1 | 5/2009 |
| WO | 2009/116954 A2 | 9/2009 |
| WO | 2009/144536 A1 | 12/2009 |
| WO | 2010/149161 A1 | 12/2010 |
| WO | 2011/009055 A2 | 1/2011 |

OTHER PUBLICATIONS

U.S. Appl. No. 12/961,369, filed Dec. 6, 2010, Non-Final Office Action mailed Feb. 13, 2014, 21 pages.
U.S. Appl. No. 13/010,557, filed Jan. 20, 2011, Final Rejection mailed Jan. 16, 2014, 17 pages.
U.S. Appl. No. 13/010,557, filed Jan. 20, 2011, Non-Final Rejection mailed Aug. 5, 2013, 17 pages.
U.S. Appl. No. 13/192,287, filed Jul. 27, 2011, Final Office Action mailed Jan. 28, 2014, 18 pages.
U.S. Appl. No. 13/035,474, filed Feb. 25, 2011, Non Final Rejection mailed Mar. 6, 2014, 20 pages.
"Android App Reviews & Showcase Just a Tapp Away," Android Tapp, 10pp. Found online at http://www.androidtapp.com/download-the-weather-channel-android-app-from-your-tv/, Oct. 22, 2010.
O'Sullivan, "Can Mobile Barcodes Work on Tv?," India and Asia Pacific Mobile Industry Reports, Sep. 2009, 4 pp. Found online at http://gomonews.com/can-mobile-barcodes-work-on-tv/, Feb. 5, 2013.
"FOX TV Uses QR Codes," 2D Barcode Strategy, Sep. 2010, 6 pp. Found online at http://www.2dbarcodestrategy.com/2010/09/fox-tv-uses-qr-codes.html, Oct. 22, 2010.
"FOX's Fringe Uses QR Code," 2D Barcode Strategy, Oct. 2010, 4 pp. Found on the Internet at http://www.2dbarcodestrategy.com/2010/10/foxs-fringe-uses-qr-code.html, Oct. 22, 2010.
"Mobile Paths: QR Codes Come to TV," Mobile Behavior: An Omnicom Group Company, Sep. 2010, 8 pp. Found online at http://www.mobilebehavior.com/2010/09/27/mobile-paths-qr-codes-come-to-tv, Oct. 22, 2010.
"What Can I Do with the QR Barcode," Search Magnet Local-QR Barcode Technology, 2 pp. Found online at http://www.searchmagnetlocal.com/qr_barcode_technology.html, Oct. 22, 2010.
Byford, D., "Universal Interactive Device," International Business Machines Corporation, Jun. 1998, 1 page.
Costedio, K., "Bluefly QR Codes Debut on TV," 2 pp. Found online at http://www.barcode.com/Mobile-Barcode-news/bluefly-qr-codes-debut-on-tv.html, Oct. 22, 2010.
Extended European Search Report for EP 12152690.9 dated Jun. 19, 2012, 9 pages.
Gao, J., et al., "A 2D Barcode-Based Mobile Payment System," Multimedia and Ubiquitous Engineering, 2009, 10 pp. Found online at http://ieeexplore.ieee.org/Xplore/login.jsp?url=http%3A%2F%2Fieeexplore.ieee.org%2Fie . . . , Oct. 22, 2010.
International Search Report and Written Opinion of PCT/US11/59977 mailed on Mar. 19, 2012, 7 pages.
International Preliminary Report on Patentability of PCT/US2011/059977 mailed on Jun. 6, 2013, 6 pages.
International Search Report and Written Opinion of PCT/US11/60002 mailed on Feb. 15, 2012, 7 pages.
International Search Report and Written Opinion of PCT/US11/60094 mailed on Mar. 30, 2012, 7 pages.
International Search Report and Written Opinion of PCT/US11/60104 mailed on Mar. 29, 2012, 9 pages.
International Search Report and Written Opinion of PCT/US11/60121 mailed on Feb. 14, 2012, 7 pages.
International Search Report and Written Opinion of PCT/US11/61074 mailed on Jan. 6, 2012, 11 pages.
International Search Report and Written Opinion of PCT/US11/61211 mailed on Mar. 29, 2012, 8 pages.
International Search Report and Written Opinion of PCT/US11/61773 mailed on Feb. 21, 2012, 7 pages.
International Search Report and Written Opinion of PCT/US11/61778 mailed on Mar. 2, 2012, 7 pages.
International Search Report and Written Opinion of PCT/US11/63111 mailed on Apr. 4, 2012, 9 pages.
International Search Report and Written Opinion of PCT/US11/64709 mailed on Apr. 10, 2012, 8 pages.
International Search Report and Written Opinion of PCT/US2011/060098 mailed on Mar. 29, 2012, 10 pages.
International Search Report and Written Opinion of PCT/US2011/063308 mailed on Mar. 29, 2012, 10 pages.
International Search Report and Written Opinion of PCT/US2011/068161 mailed on Jun. 14, 2012, 19 pages.
International Preliminary Report on Patentability of PCT/US2011/068161 mailed on Jul. 25, 2013, 13 pages.
International Search Report and Written Opinion of PCT/US2011/068176 mailed on Mar. 29, 2012, 15 pages.
International Search Report and Written Opinion of PCT/US2012/021657 mailed on May 23, 2012, 12 pages.
International Search Report of PCT/US2012/022581 mailed on Oct. 8, 2012, 18 pages.
International Search Report and Written Opinion of PCT/US2012/022405 mailed on Apr. 19, 2012, 11 pages.
International Search Report and Written Opinion of PCT/US2012/024923 mailed on May 22, 2012, 12 pages.
International Search Report and Written Opinion of PCT/US2012/024956 mailed on Jun. 11, 2012, 10 pages.
International Search Report and Written Opinion of PCT/US2012/025502 mailed Jun. 8, 2012, 13 pages.
International Preliminary Report on Patentability of PCT/US2012/025502 mailed Sep. 6, 2013, 9 pages.
International Search Report and Written Opinion of PCT/US2012/025607 mailed Jun. 8, 2012, 13 pages.

(56) References Cited

OTHER PUBLICATIONS

International Search Report and Written Opinion of PCT/US2012/025634 mailed on May 7, 2012, 8 pages.
International Search Report and Written Opinion of PCT/US2012/026373 mailed Jun. 13, 2012, 14 pages.
International Search Report and Written Opinion of PCT/US2012/026624 mailed Aug. 29, 2012, 14 pages.
International Search Report and Written Opinion of PCT/US2012/026722 mailed Jun. 28, 2012, 11 pages.
International Search Report and Written Opinion of PCT/US2012/048032, mailed Oct. 16, 2012, 14 pages.
International Search Report of PCT/US11/60109 mailed on Feb. 14, 2012, 3 pages.
Liu, Yue et al., "Recognition of QR code with mobile phones," Control and Decision Conference, 2008. CCDC 2008. Jul. 2-4, 2008, pp. 203, 206.
Ngee, S., "Data Transmission Between PDA and PC Using WiFi for Pocket Barcode Application," Thesis, University Teknologi Malaysia, May 2007, 126 pp. Found online at http://eprints.utm.my/6421/1/SeahYeowNgeeMFKE20007TTT.pdf, Oct. 22, 2010.
Olson, E., "Bar Codes add Detail on Items in TV Ads," New York Times, Sep. 2010, 3 pp. Found online at http:www.nytimes.com/2010/09/27/business/media/27bluefly.html?src=busin, Oct. 22, 2010.
Rekimoto, J., et al., "Augment-able Reality: Situated Communication Through Physical and Digital Spaces," Sony Computer Science Laboratory, 2002, 8 pp. Found online at Citeseer: 10.1.1.20.34[1].pdf, Oct. 22, 2010.
Schmitz, A., et al., "Ad-Hoc Multi-Displays for Mobile Interactive Applications," 31st Annual Conference of the European Association for Computer Graphics (Eurographics 2010), May 2010, vol. 29, No. 2, 8 pages.
Silverstein, B., "QR Codes and TV Campaigns Connect," ReveNews, Sep. 2010, 5 pp. Found online at http://www.revenews.com/barrysilverstein/qr-codes-and-tv-campaigns-connect/, Oct. 22, 2010.
Smith, L., "QR Barcodes Make History on Global TV," 3 pp. Found online at http://lindsaysmith.com/worlds-first-mobio-mini-telethon/, Oct. 22, 2010.
Yamanari, T., et al., "Electronic Invisible Code Display Unit for Group Work on Reminiscence Therapy," Proceedings of the International MultiConference of Engineers and Computer Scientists 2009, vol. 1, IMECS 2009, Mar. 2009, 6 pp. Retrieved from the Internet: http://citeseerx.ist.psu.edu/viewdoc/download?doi=10.1.1.145.6904&rep1&type=pdf.
Yang, C., et al., "Embedded Digital Information Integrated by Video-on-Demand System," Proceedings of the Fourth International Conference on Networked Computing and Advanced Information Management, IEEE Computer Society, 2008, 6 pages.
U.S. Appl. No. 12/958,073, filed Dec. 1, 2010, Office Action mailed Aug. 31, 2012, 12 pages.
U.S. Appl. No. 12/958,073, filed Dec. 1, 2010, Notice of Allowance mailed Jan. 17, 2013, 17 pages.
U.S. Appl. No. 12/961,369, filed Dec. 6, 2010, Non-Final Office Action mailed Mar. 9, 2012, 17 pages.
U.S. Appl. No. 12/964,478, filed Dec. 9, 2010, Non-Final Office Action mailed Mar. 26, 2013, 19 pages.
U.S. Appl. No. 12/964,478, filed Dec. 9, 2010, Final Office Action mailed Sep. 16, 2013, 12 pages.
U.S. Appl. No. 12/971,349, filed Dec. 17, 2010, Office Action mailed Nov. 10, 2011, 9 pages.
U.S. Appl. No. 12/971,349, filed Dec. 17, 2010, Final Office Action mailed Jan. 20, 2012, 10 pages.
U.S. Appl. No. 12/961,369, filed Dec. 6, 2010, Final Rejection mailed Oct. 30, 2012, 17 pages.
U.S. Appl. No. 12/961,369, filed Dec. 6, 2010, Non-Final Office Action mailed Mar. 25, 2013, 17 pages.
U.S. Appl. No. 12/961,369, filed Dec. 6, 2010, Non-Final Office Action mailed Jul. 12, 2013, 22 pages.
U.S. Appl. No. 12/971,349, filed Dec. 7, 2010, Notice of Allowance mailed Oct. 2, 2013, 24 pages.
U.S. Appl. No. 12/971,349, filed Dec. 7, 2010, Final Rejection mailed Oct. 24, 2012, 11 pages.
U.S. Appl. No. 12/971,349, filed Dec. 17, 2010, Office Action mailed Jul. 16, 2012, 11 pages.
U.S. Appl. No. 12/981,244, filed Dec. 29, 2010, Office Action mailed Dec. 21, 2012, 23 pages.
U.S. Appl. No. 12/981,244, filed Dec. 29, 2010, Final Office Action mailed Oct. 30, 2013, 10 pages.
U.S. Appl. No. 12/984,385, filed Jan. 4, 2011, Notice of Allowance mailed Nov. 28, 2012, 11 pages.
U.S. Appl. No. 12/984,385, filed Jan. 4, 2011, Office Action mailed Jul. 12, 2012, 16 pages.
U.S. Appl. No. 12/986,721, filed Jan. 7, 2011, Office Action mailed Mar. 16, 2012, 6 pages.
U.S. Appl. No. 12/986,721, filed Jan. 7, 2011, Notice of Allowance mailed Jun. 21, 2012, 7 pages.
U.S. Appl. No. 12/953,227, filed Nov. 23, 2010, Final Office Action mailed May 24, 2013, 17 pages.
U.S. Appl. No. 12/953,227, filed Nov. 23, 2010, Office Action mailed Nov. 7, 2012, 31 pages.
U.S. Appl. No. 13/015,382, filed Jan. 27, 2011, Office Action Mailed Nov. 13, 2012, 7 pages.
U.S. Appl. No. 13/015,382, filed Jan. 27, 2011, Notice of Allowance mailed Feb. 22, 2013, 12 pages.
U.S. Appl. No. 13/016,483, filed Jan. 28, 2011 Office Action mailed Nov. 2, 2012, 18 pages.
U.S. Appl. No. 13/016,483, filed Jan. 28, 2011 Final Office Action mailed Jun. 27, 2013, 13 pages.
U.S. Appl. No. 12/953,273, filed Nov. 23, 2010, Notice of Allowance, mailed Oct. 18, 2012, 11 pages.
U.S. Appl. No. 12/965,645, filed Dec. 10, 2010, Non-Final Office Action, mailed Jul. 19, 2013, 20 pages.
U.S. Appl. No. 12/973,431, filed Dec. 20, 2010, Non-Final Rejection mailed May 15, 2013, 30 pages.
U.S. Appl. No. 12/973,431, filed Dec. 20, 2010, Final Office Action mailed Aug. 27, 2013, 11 pages.
U.S. Appl. No. 13/007,317, filed Jan. 14, 2011, Office action mailed Dec. 19, 2012, 29 pages.
U.S. Appl. No. 13/014,591, Notice of Allowance mailed May 24, 2013, 32 pages.
U.S. Appl. No. 13/020,678, filed Feb. 3, 2011, Office Action mailed Jul. 30, 2012, 15 pages.
U.S. Appl. No. 13/020,678, filed Feb. 3, 2011, Notice of Allowance mailed Jan. 3, 2013, 13 pages.
U.S. Appl. No. 13/007,317, Notice of Allowance mailed May 13, 2013, 16 pages.
U.S. Appl. No. 13/028,030, filed Feb. 15, 2011, Office Action mailed Jan. 11, 2013, 14 pages.
U.S. Appl. No. 13/031,115, Notice of Allowance mailed Apr. 16, 2013, 24 pages.
U.S. Appl. No. 13/034,482, filed Feb. 24, 2011, Final Office Action mailed Apr. 25, 2013, 19 pages.
U.S. Appl. No. 13/034,482, filed Feb. 24, 2011, Office Action mailed Oct. 19, 2012, 11 pages.
U.S. Appl. No. 13/035,474, filed Feb. 25, 2011, Office Action mailed Oct. 30, 2012, 11 pages.
U.S. Appl. No. 13/035,474, filed Feb. 25, 2011, Final Rejection mailed Mar. 29, 2013, 20 pages.
U.S. Appl. No. 12/960,285, filed Dec. 3, 2010, Final Office Action mailed Apr. 18, 2013, 14 pages.
U.S. Appl. No. 12/960,285, filed Dec. 3, 2010, Non-Final Office Action mailed Dec. 6, 2012, 17 pages.
U.S. Appl. No. 13/006,270, filed Jan. 13, 2011, Non-Final Office Action mailed Oct. 8, 2013, 20 pages.
U.S. Appl. No. 13/028,030, filed Feb. 15, 2011, Non-Final Office Action mailed Dec. 17, 2013, 60 pages.
U.S. Appl. No. 13/035,525, filed Feb. 25, 2011, Office Action mailed Jul. 18, 2012, 15 pages.
U.S. Appl. No. 13/035,525, filed Feb. 25, 2011, Final Office Action mailed Jan. 31, 2013, 26 pages.

(56) References Cited

OTHER PUBLICATIONS

U.S. Appl. No. 13/035,525, filed Feb. 25, 2011, Non-Final Office Action mailed May 15, 2013, 15 pages.
U.S. Appl. No. 13/035,525, filed Feb. 25, 2011, Final Office Action mailed Sep. 12, 2013, 21 pages.
U.S. Appl. No. 13/037,302, filed Feb. 28, 2011, Office Action mailed Mar. 1, 2013, 20 pages.
U.S. Appl. No. 13/037,302, filed Feb. 28, 2011 Final Office Action mailed Oct. 16, 2013, 28 pages.
U.S. Appl. No. 13/037,312, filed Feb. 28, 2011, Office Action mailed Aug. 15, 2012, 9 pages.
U.S. Appl. No. 13/037,312, filed Feb. 28, 2011, Final Office Action mailed Feb. 28, 2013, 18 pages.
U.S. Appl. No. 13/037,316, filed Feb. 28, 2011, Office Action mailed Jan. 30, 2013, 21 pages.
U.S. Appl. No. 13/037,316, filed Feb. 28, 2011, Final Office Action mailed Aug. 28, 2013, 13 pages.
U.S. Appl. No. 13/037,333, filed Feb. 28, 2011 Notice of Allowance mailed Jan. 18, 2013, 27 pages.
U.S. Appl. No. 13/192,287, filed Jul. 27, 2011 Non Final Office Action mailed Jun. 13, 2013, 22 pages.
U.S. Appl. No. 13/673,480, filed Nov. 9, 2012 Office Action mailed Jan. 16, 2013, 27 pages.
U.S. Appl. No. 13/673,480, filed Nov. 9, 2012 Final Office Action mailed Sep. 9, 2013, 10 pages.
U.S. Appl. No. 13/673,480, filed Nov. 9, 2012 Notice of Allowance mailed Nov. 12, 2013, 16 pages.
Jung, Eui-Hyun et al., "A Robust Digital Watermarking System Adopting 2D Barcode against Digital Piracy on P2P Network," IJCSNS International Journal of Computer Science and Network Security, vol. 6, No. 10, Oct. 2006, 6 pages.
First Office Action by the Mexican Institute of Industrial Property for Mexican Patent Application No. MX/a/2013/00988 dated Aug. 14, 2014, 3 pages.
International Preliminary Report on Patentability for PCT/US2011/060002 mailed Jun. 6, 2013, 6 pages.
International Preliminary Report of Patentability for PCT/US2011/060094 mailed Jun. 20, 2013, 6 pages.
International Preliminary Report on Patentability for PCT/US2011/060121 mailed Jun. 20, 2013, 6 pages.
International Preliminary Report on Patentability for PCT/US2011/061211 mailed Jul. 4, 2013, 7 pages.
International Preliminary Report on Patentability for PCT/US2011/061773 mailed Jun. 6, 2013, 6 pages.
International Preliminary Report on Patentability for PCT/US2011/061778 mailed Jul. 11, 2013, 6 pages.
International Preliminary Report on Patentability for PCT/US2011/060098 mailed Jun. 13, 2013, 9 pages.
International Preliminary Report on Patentability for PCT/US2011/063308 mailed Jul. 18, 2013, 9 pages.
International Preliminary Report on Patentability for PCT/SU2012/022581 mailed Aug. 8, 2013, 12 pages.
International Preliminary Report on Patentability for PCT/US2012/022405 mailed Aug. 8, 2013, 7 pages.
International Preliminary Report on Patentability for PCT/US2012/024923 mailed Aug. 29, 2013, 8 pages.
International Preliminary Report on Patentability for PCT/US2012/024956 mailed Aug. 29, 2013, 7 pages.
International Preliminary Report on Patentability for PCT/US2012/025607 mailed Sep. 12, 2013, 8 pages.
International Preliminary Report on Patentability for PCT/US2012/025634 mailed Sep. 6, 2013, 5 pages.
International Preliminary Report on Patentability for PCT/US2012/026373 mailed Sep. 12, 2013, 10 pages.
International Preliminary Report on Patentability for PCT/US2012/026624 mailed Sep. 12, 2013, 12 pages.
International Preliminary Report on Patentability for PCT/US2011/060109 mailed Jun. 20, 2013, 7 pages.
Office Action of the Intellectual Property Office for ROC Patent App. No. 101101486, dated Aug. 5, 2014, 4 pages.
The First Office Action for Mexican Patent Application No. MX/a/2013/006262 is not translated into English. This document is from prosecution of the corresponding foreign matter for which we do not have a translation. Dated Aug. 7, 2014, 2 pages.
Publication of PCT/US2011/059977 by the India Controller General of Patents Designs and Trademarks as India Patent Publication No. 4694/CHENP/2013 A on Sep. 5, 2014, 1 page.
Publication of PCT/US2012/025634 by the India General Patents Designs and Trademarks as India Patent Publication No. 6967/CHENP/2013 A on Aug. 1, 2014, 1 page.
U.S. Appl. No. 13/034,482, filed Feb. 24, 2011 Notice of Allowance mailed Aug. 29, 2014, 45 pages.
U.S. Appl. No. 13/035,474, filed Feb. 25, 2011 Final Rejection mailed Aug. 27, 2014, 38 pages.
U.S. Appl. No. 13/006,270, filed Jan. 13, 2011 Non-Final Office Action mailed Sep. 12, 2014, 41 pages.
Extended European Search Report for EP 11842890.3 dated Mar. 26, 2014, 8 pages.
Extended European Search Report for EP 11850819.1 dated Mar. 17, 2014, 5 pages.
Extended European Search Report for EP 11846486 dated Mar. 26, 2014, 5 pages.
Extended European Search Report for EP 11852630 dated Jun. 30, 2014, 7 pages.
International Preliminary Report on Patentability of PCT/US2012/048032 mailed on Apr. 3, 2014, 6 pages.
International Preliminary Report on Patentability of PCT/US2011/063111 mailed Jun. 13, 2013, 8 pages.
Kato et al, "2D barcodes for mobile phones", Mobile Technology, Applications and Systems, 2005 2nd International Conference on Guangzhou, China Nov. 15-17, 2005, Piscataway, NJ, USA, IEEE, Piscataway, NJ, USA, Nov. 15, 2005, pp. 8pp. 8, XP031887368, DOI:10.1109/MTAS.2005.207166; ISBN: 978-981-05-4573-4, 8 pages.
Office Action and Search Report for ROC (Taiwan) Patent Application No. 10014870 dated May 7, 2014, issued in the corresponding foreign application, 9 pages.
Office Action and Search Report for ROC (Taiwan) Patent Application No. 100142966 dated May 27, 2014, 6 pages.
Office Action for European Patent Application No. 12719817.4 dated Jun. 23, 2014 issued in the corresponding foreign application, 5 pages.
U.S. Appl. No. 14/179,336, filed Feb. 12, 2014, Non-Final Office Action mailed May 22, 2014, 14 pages.
U.S. Appl. No. 12/961,369, filed Dec. 6, 2010, Notice of Allowance mailed Jul. 16, 2014, 15 pages.
U.S. Appl. No. 12/981,244, filed Dec. 29, 2010, Notice of Allowance mailed Mar. 25, 2014, 17 pages.
U.S. Appl. No. 12/965,645, filed Dec. 10, 2010, Final Office Action, mailed Mar. 18, 2014, 24 pages.
U.S. Appl. No. 12/965,645, filed Dec. 10, 2010, Notice of Allowance, mailed Jun. 20, 2014, 35 pages.
U.S. Appl. No. 13/028,030, filed Feb. 15, 2011, Final Office Action mailed Jul. 11, 2014, 43 pages.
U.S. Appl. No. 12/960,285, filed Dec. 3, 2010, Non-Final Office Action mailed Jun. 6, 2014, 19 pages.
U.S. Appl. No. 13/006,270, filed Jan. 13, 2011, Final Office Action mailed May 9, 2014, 41 pages.
U.S. Appl. No. 13/037,312, filed Feb. 28, 2011, Notice of Allowance mailed Jun. 13, 2013, 10 pages.
U.S. Appl. No. 13/968,611, filed Aug. 16, 2013, Notice of Allowance mailed May 2, 2014, 40 pages.
U.S. Appl. No. 13/968,611, filed Aug. 16, 2013, Non-Final Office Action mailed Jan. 17, 2014, 21 pages.
First Examination Report from European Patent Office dated Feb. 4, 2015 for EP 12716751.8, 4 pages.
Office Action from European Patent Office for Application No. 12716728.6 dated Feb. 26, 2015, 4 pages.
European Search Report for EP 11844504 dated Feb. 24, 2015, 10 pages.
U.S. Appl. No. 14/179,336, filed Feb. 12, 2014 Notice of Allowance mailed Feb. 18, 2015, 15 pages.

(56) References Cited

OTHER PUBLICATIONS

U.S. Appl. No. 13/035,474, filed Feb. 25, 2011 Non Final Rejection mailed Feb. 17, 2015, 57 pages.
Office Action and Search Report for ROC (Taiwan) Patent Application No. 100149344 issued Jan. 23, 2015, 8 pages.
Office Action for European Patent Application No. 12707435.9 dated Mar. 12, 2015, 6 pages.
U.S. Appl. No. 12/953,227, filed Nov. 23, 2010, Non Final Office action mailed Mar. 24, 2015, 39 pages.
U.S. Appl. No. 13/006,270, filed Jan. 13, 2011, Final Office Action mailed Mar. 23, 2014, 51 pages.
Office Action of the Intellectual Property Office for ROC Patent App. No. 100143194 dated Sep. 23, 2014, 10 pages.
Office Action of the Intellectual Property Office for ROC Patent App. No. 100142978 dated Sep. 23, 2014, 9 pages.
U.S. Appl. No. 14/179,336, filed Feb. 12, 2014 Final Office Action mailed Dec. 1, 2014, 30 pages.
U.S. Appl. No. 13/302,717, filed Nov. 22, 2011 Non-Final Rejection mailed Dec. 18, 2014, 71 pages.
U.S. Appl. No. 13/028,030, filed Feb. 15, 2011, Non-Final Office Action mailed Feb. 6, 2015, 56 pages.
U.S. Appl. No. 13/016,483, filed Jan. 28, 2011 Non-Final Office Action mailed Nov. 3, 2014, 33 pages.
U.S. Appl. No. 12/973,431, filed Dec. 20, 2010 Non-Final Rejection mailed Dec. 19, 2014, 30 pages.
U.S. Appl. No. 12/960,285, filed Dec. 3, 2010 Final Office Action mailed Dec. 3, 2014, 19 pages.
Examination Search Report from the European Patent Office dated Dec. 4, 2015 for EP 12707418.5, 8 pages.
European Office Action for EP 12716751.8 mailed Nov. 11, 2015, 4 pages.
Office Action for EP 11850819.1 dated Nov. 12, 2015, 4 pages.
First Office Action with Search Report for CN 201280013891.3 issued Jan. 15, 2016, 13 pages.
First Office Action and Search Report from State Intellectual Property Office for CN Appln. No. 201180064527.5 issued Oct. 23, 2015, 10 pages.
Second Office Action issued by State Intellectual Property Office for CN Pat. Appln. No. 201180066584.7 issued on Jan. 11, 2016, 5 pages.
Search Report for Patent Application ROC (Taiwan) Patent Application No. 100149344 mailed Oct. 28, 2015, 1 page.
U.S. Appl. No. 13/302,717, filed Nov. 22, 2011 Non Final Rejection mailed Dec. 2, 2015, 27 pages.
U.S. Appl. No. 13/016,483, filed Jan. 28, 2011 Non-Final Office Action mailed Dec. 14, 2015, 27 pages.
U.S. Appl. No. 13/037,302, filed Feb. 28, 2011, Non-Final Office Action mailed Jan. 12, 2016, 62 pages.
U.S. Appl. No. 13/192,287, filed Jul. 27, 2011, Notice of Allowance mailed Dec. 14, 2015, 14 pages.
U.S. Appl. No. 13/864,474, filed Apr. 17, 2013 Final Office Action mailed Nov. 20, 2015, all pages.
Second Office Action for CN 201180065044.7 issued Sep. 9, 2015 by the State Intellectual Property Office (SIPO), 20 pages.
U.S. Appl. No. 12/953,227, filed Nov. 23, 2010, Final Office Action mailed Nov. 6, 2015, 26 pages.
U.S. Appl. No. 12/960,285, filed Dec. 3, 2010, Notice of Allowance mailed Nov. 18, 2015, 31 pages.
Office Action from State Intellectual Property Office for CN Appln. No. 201180056242.7, 10 pages.
Office Action and Search Report from the State Intellectual Property Office for CN Pat. Appln. No. 201180066584.7 issued on Jul. 10, 2015, 12 pages.
Notice of Allowance and search report for ROC (Taiwan) Patent Application No. 101106288 received, 9 pages.
U.S. Appl. No. 13/864,474, filed Apr. 17, 2013 Non Final Office Action mailed Mar. 23, 2016, all pages.
First Examination Report from European Patent Office dated May 18, 2015 for EP 11849496.2, 7 pages.

European Office Action for EP 11842890.3 dated Mar. 13, 2015, 8 pages.
European Search Report for EP 11855065 dated Mar. 6, 2014, 6 pages.
Office Action for EP 11855065 dated Mar. 13, 2015, 6 pages.
First Office Action for CN 201180065044.7 issued Feb. 13, 2015 by the State Intellectual Property Office, 4 pages.
U.S. Appl. No. 13/302,717, filed Nov. 22, 2011 Final Rejection mailed May 8, 2015, 44 pages.
U.S. Appl. No. 13/037,302, filed Feb. 28, 2011 Final Office Action mailed May 4, 2015, 54 pages.
U.S. Appl. No. 13/016,483, filed Jan. 28, 2011 Final Office Action mailed May 13, 2015, 34 pages.
U.S. Appl. No. 12/973,431, filed Dec. 20, 2010 Notice of Allowance mailed May 28, 2015, 20 pages.
U.S. Appl. No. 12/960,285, filed Dec. 3, 2010 Non-Final Office Action mailed May 14, 2015, 21 pages.
Office Action from European Patent Office for Application No. 11852630.0 dated May 12, 2015, 7 pages.
Second Office Action from State Intellectual Property Office for CN Appln. No. 201180056242.7 issued Jan. 26, 2016, all pages.
First Office Action and Search Report from the State Intellectual Property Office (SIPO) for CN 201180056249.9 issued on Feb. 3, 2016, all pages.
First Office Action for CN 201280010873 issued Mar. 2, 2016, all pages.
European Office Action for EP 11842890.3 dated May 9, 2016, all pages.
Supplementary European Search Report for EP 11843045 completed Mar. 31, 2016, all pages.
Office Action for European Patent App. 12704473.3 mailed Apr. 29, 2016, all pages.
Supplementary European Search Report for EP 11843423 completed Mar. 23, 2016, 8 pages.
First Office Action including Search Report from the State Intellectual Property Office for CN Patent Appln. No. 201280014034.5 issued on Apr. 5, 2016, all pages.
Office Action and Search Report for ROC (Taiwan) Pat. Appln. No. 101106313, all pages.
Notice of Decision to Grant for CN 201280010873 on Mar. 25, 2016, all pages.
U.S. Appl. No. 13/035,474, filed Feb. 25, 2011 Non Final Rejection mailed Sep. 11, 2015, 65 pages.
U.S. Appl. No. 13/864,474, filed Apr. 17, 2013 Non Final Office Action mailed Aug. 11, 2015, 59 pages.
U.S. Appl. No. 13/028,030, filed Feb. 15, 2011, Final Office Action mailed Jul. 17, 2015, 63 pages.
Office Action for EP 12705768.5 mailed May 25, 2016, all pages.
Third Office Action from State Intellectual Property Office for CN Appln. No. 201180056242.7 issued Jul. 28, 2016, all pages.
Second Office Action from State Intellectual Property Office for CN Appln. No. 201180064527.5 issued Jun. 12, 2016, all pages.
Notice of Allowance for Mexican Patent Application No. MX/a/2013/009791 dated Mar. 15, 2016, 1 page.
U.S. Appl. No. 13/302,717, filed Nov. 22, 2011 Non Final Rejection mailed Jun. 16, 2016, all pages.
U.S. Appl. No. 13/016,483, filed Jan. 28, 2011 Final Office Action mailed Jul. 5, 2016, all pages.
U.S. Appl. No. 13/037,302, filed Feb. 28, 2011, Final Office Action mailed Jul. 12, 2016, all pages.
Office Action for Korean Patent Application No. 10-2013-7015610 mailed Oct. 21, 2016, all pages. (no English translation available).
Office Action for EP 11811502.1 mailed Aug. 29, 2016, all pages.
Publication of Brazil appln No. BR 11 2013 012218-8 on Aug. 9, 2016, 1 page.
Second Office Action CN 201280013891.3 issued Aug. 12, 2016, all pages.
Office Action dated Oct. 17, 2016 for European Patent Appln. No. 12701638.4, all pages.
U.S. Appl. No. 14/852,787, filed Sep. 14, 2015, Non-Final Office Action mailed Sep. 14, 2016, all pages.

* cited by examiner

PROGRESS BAR

CROSS REFERENCES

This application claims priority from European Patent Application No. EP 11166848.9, filed May 20, 2011, entitled "IMPROVED PROGRESS BAR," which is hereby incorporated by reference, as if set forth in full in this document, for all purposes.

FIELD OF THE INVENTION

The present invention relates to progress bars used to measure activities with potentially variable speeds.

BACKGROUND OF THE INVENTION

Often progress bars are used to measure the progress of a given activity. An example of a commonly measured activity is the progress of a download from the Internet. A user device, such as a set-top-box (STB) or a computer, may connect to the internet, via an internet connection, to download data from a remote location to a local storage device such as an internal hard drive or other type of memory for local use. Various methods exist for transferring or downloading data from one device to another. File sharing is an example of transferring large amounts of data across the internet. Email allows data files to be transferred from one user's system to another. Data can be uploaded to a website or file transfer protocol (FTP) server for download.

As data is received by the recipient device typically a progress meter, or more commonly a progress bar, is used to indicate the amount of data received. Often the progress bar will output this information as an indication in relation to the total amount of data that is to be downloaded for the particular task, although this is not always available. An example of such a progress bar is shown in FIG. 1.

Although progress bars such as those in FIG. 1 do indicate the actual progress, to completion, of an activity, such as a download, they do not indicate the quality or speed of progress. To overcome this, a numeric value is displayed on, or next to, the progress bar representing a real world number, such as actual download speed (e.g. in Kb/s). However, such a numeric value may not be a particularly good indication of how well a download is progressing, and it is questionable how useful such a number actually is to the user.

The present inventor has appreciated that it would be advantageous to provide an improved progress meter, particularly one that allows a user to instantly see the quality of the rate of progress without needing to read or understand specific measurements.

SUMMARY OF THE INVENTION

The invention is defined in the claims, to which reference is now directed. Preferred features are defined in the dependent claims.

Embodiments of the invention provide a method for displaying the progress of an activity performed on a user device. The method includes outputting, to a display, a progress indicator indicative of the progress made in completing an activity, such as a download, and updating the progress indicator as the activity proceeds. Simultaneously, a first progress rate indicator is also output to the display, the progress rate indicator having a property indicative of the rate at which the activity is being progressed. The property of the progress rate indicator is based on a value determined by receiving a rate value indicative of the activity progress rate and comparing the rate value with a value indicative of the maximum progress rate of the user device for the particular activity.

The progress rate indicator is preferably a displayed item having a visual appearance indicative of the portion of the rate at which the activity is being completed compared to a maximum value. In other words, the progress rate indicator indicates progress rate relative to a maximum rate.

The progress rate indicator is, preferably, updated throughout the course of the activity being performed, to indicate the change in rate of performance. To achieve this the method may further include the step of displaying one or more further updated progress rate indicators, subsequent to displaying the first progress rate indicator. Subsequent progress rate indicators preferably replace the previous rate indicators to avoid confusion.

Embodiments of the invention can be applied to any activity that has a variable speed. A progress indicator, such as a progress bar, is displayed, but rather than displaying a simple monochrome, or fixed color, bar the bar itself is colored to represent the speed at which the activity is being completed. Different colors are dynamically used to represent different progress rates.

The absolute measure of progress provided by the progress bar can be static, based on typical, estimated, or previously measured system performance. Alternatively it can be dynamically ranged against the maximum progress rate of the current activity, in which case the maximum progress rate value is preferably updated as a higher rate value than the previous highest rate value is received. The progress bar is then dynamically colored depending on the ongoing current progress rate.

Preferably, as mentioned above, the progress rate is indicated by visual means such as a plurality of colors or patterns. Preferably a first color is used to indicate a minimum progress rate and a second color to indicate a maximum progress rate. The progress rate indicator color may vary continuously between the first color and the second color in response to the received rate value. Alternatively, the progress rate range may be divided into discrete steps, and a different color used to indicate each step.

Preferably, the progress rate indicators are overlaid on the progress indicator. That is, the progress rate indicators are displayed such that they appear in front of the progress indicator so as to be clearly visible over the progress indicator. The progress indicator and the progress rate indicator may be integral, in that they are both contained within the same display item. The progress rate indicator may be a visual property of at least a portion of the progress indicator.

A corresponding user device may be provided, the user device being configured to undertake any of the method steps described above and below, to output a progress indicator and progress rate indicator to a display. The user device may take the form of a set top box, or may be incorporated into a set top box. A computer program may also be provided for carrying out the method steps described above or below on a suitable user device.

BRIEF DESCRIPTION OF THE DRAWINGS

Examples of the invention will now be described in more detail, with reference to the drawings in which.

DETAILED DESCRIPTION OF THE PREFERRED EMBODIMENTS

Embodiments of the invention will be described primarily with reference to the activity of downloading data from the internet, or other data source such as a device on a local network. It will be appreciated that embodiments of the invention can be applied to the monitoring of any activity in which the progress to completion has a variable, or potentially variable, rate.

Figure 1:
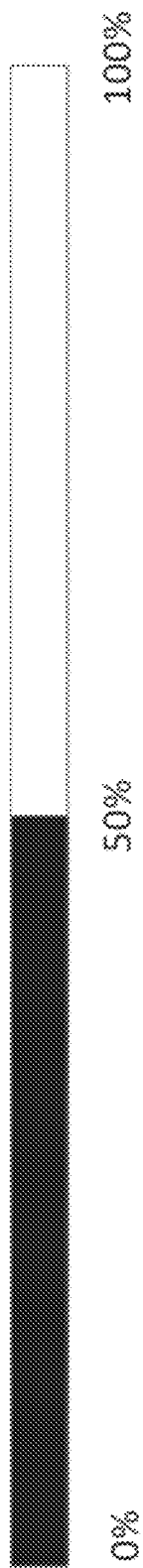
FIG. 1: is an example of a known progress bar.
Figure 2:
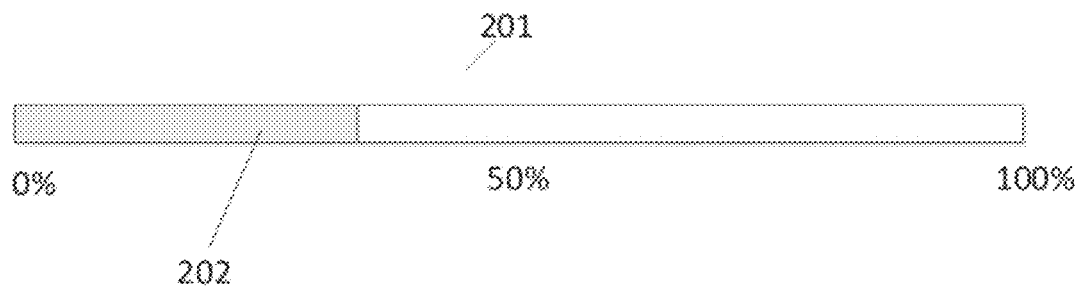
FIG. 2: is an example of a progress bar according to an embodiment of the invention.

FIG. 2 shows a progress indicator in accordance with an embodiment of the invention. The progress indicator is in the form of a progress bar 201, being a rectangular shape, a portion of which is changed visually from the remainder of the shape to indicate the progress of the download. The proportion of the bar that is visually changed indicates the proportion of the download activity that has been completed. Typically the visual change is a change in color of the portion of the bar relative to the starting color of the bar. Value indicators are provided indicating the percentage of the download that has been completed, but this is not required.

Figure 3:
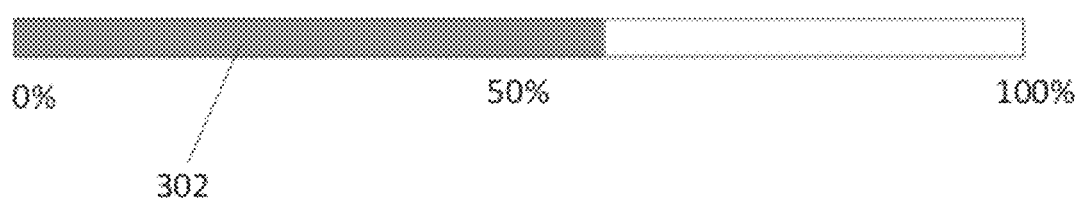
FIG. 3: is an example of the progress bar of FIG. 2 at a point later in the progress of the activity being monitored.
Figure 4:
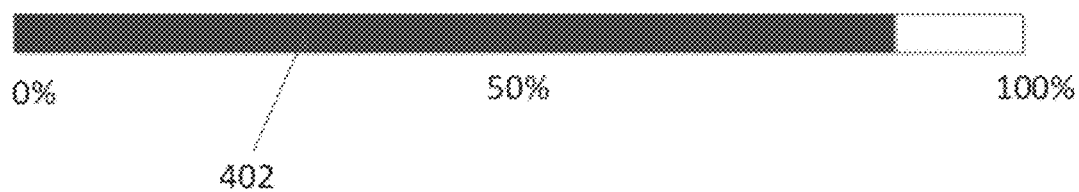
FIG. 4: is an example of the progress bar of FIG. 3 at a point later in the progress of the activity being monitored.

As shown in FIG. 2, the progress bar shows a certain portion of the download activity is complete by coloring section 202 a different color to the remainder of the bar. However, rather than the color of the complete portion 202 remaining static throughout the download activity, it is varied dependent upon the download rate. This is shown in FIGS. 3 and 4 in which the download has progressed, but the rate of download has also changed from the first rate of FIG. 2 to a second and third rate in FIGS. 3 and 4 respectively.

Figure 5:
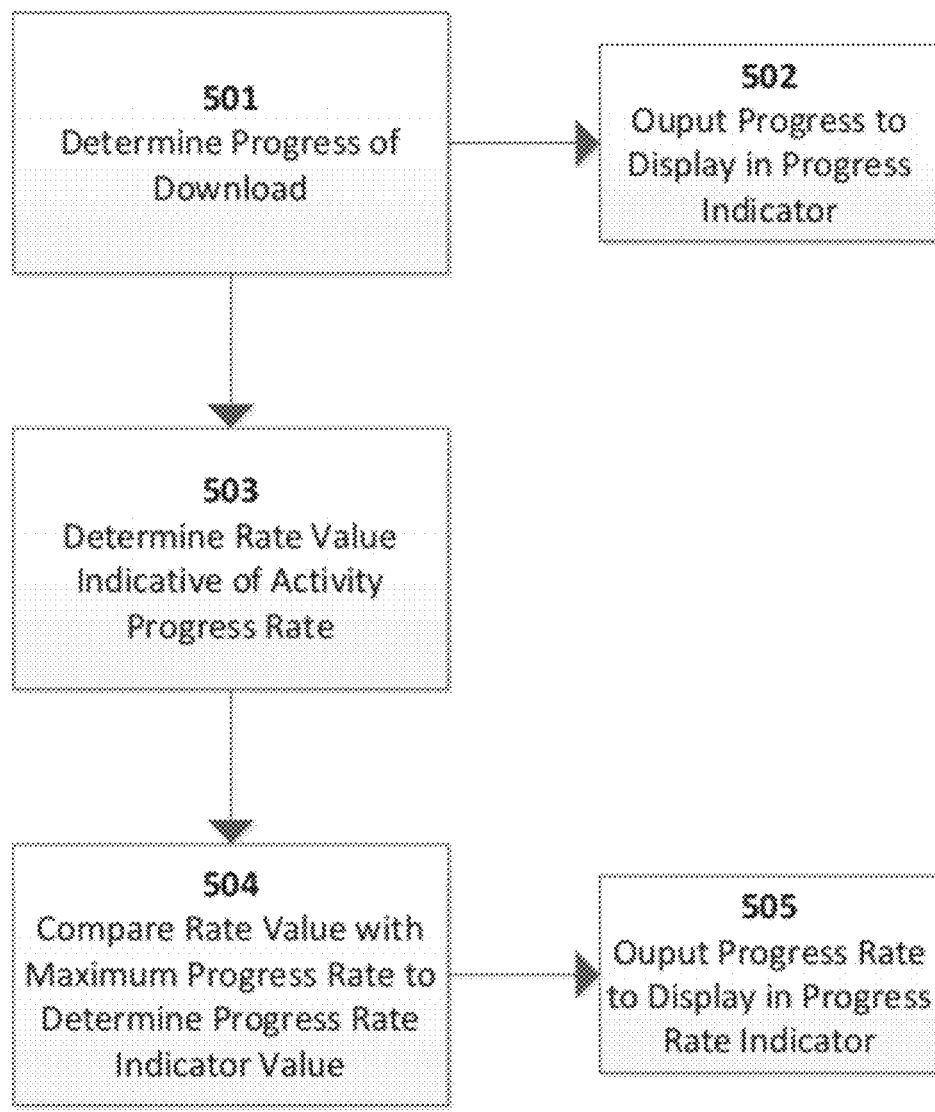
FIG. 5: is an example of a method for outputting a progress indicator and progress rate indicator according to an embodiment of the present invention.

The color of portion 202 is the progress rate indicator, indicative of the current download rate in relation to the maximum download rate of the user device on which the progress bar is running. Therefore, rather than giving the user a value indicative of the actual current download rate a value indicative of how good the performance is in comparison to expected or possible performance is provided. FIG. 5 illustrates the general method involved. At step 501 the progress of the download is determined. This can be achieved in a known way by, for example, determining the amount of data that has been downloaded to the user device and comparing this with the total amount of data to be received. The progress of the download may then be output to the user in the progress indicator, such as the progress bar shown in FIG. 2. Simultaneously, at steps 503 to 505, the progress rate indicator value or setting to be represented by the progress rate indicator is determined and output to the user in the form of the progress rate indicator. In particular, at step 503 a rate value indicative of the download rate is determined; this may be determined in a standard way as would be known to the skilled person. At step 504 the download rate is compared with the maximum progress rate of the user device do give the value to be represented by the progress rate indicator. Preferably this is achieved by determining the ratio or proportion of the actual download rate to the maximum download rate. The progress rate indicator value is then output to the user in the form of the progress rate indicator. The steps 501-502 and 503-505 may be performed independently of one another. The steps 501-502 and 503-505 may be performed continuously throughout the download at the same or at different rates such that the progress rate indicator is updated less frequently, more frequently, or as frequently as the progress indicator.

As an example of the method of FIG. 5, the user device may determine that the download has progressed to 40% completion. At the same time, the user device determines, or receives data indicating, that the download rate or speed is 200 KB/s. This is compared to the maximum download rate of the user device which is 1 MB/s. Therefore, the user device determines that the download rate is $\frac{1}{5}^{th}$ the maximum value. The progress rate indicator is set to indicate this performance and output to the user.

Figure 6:
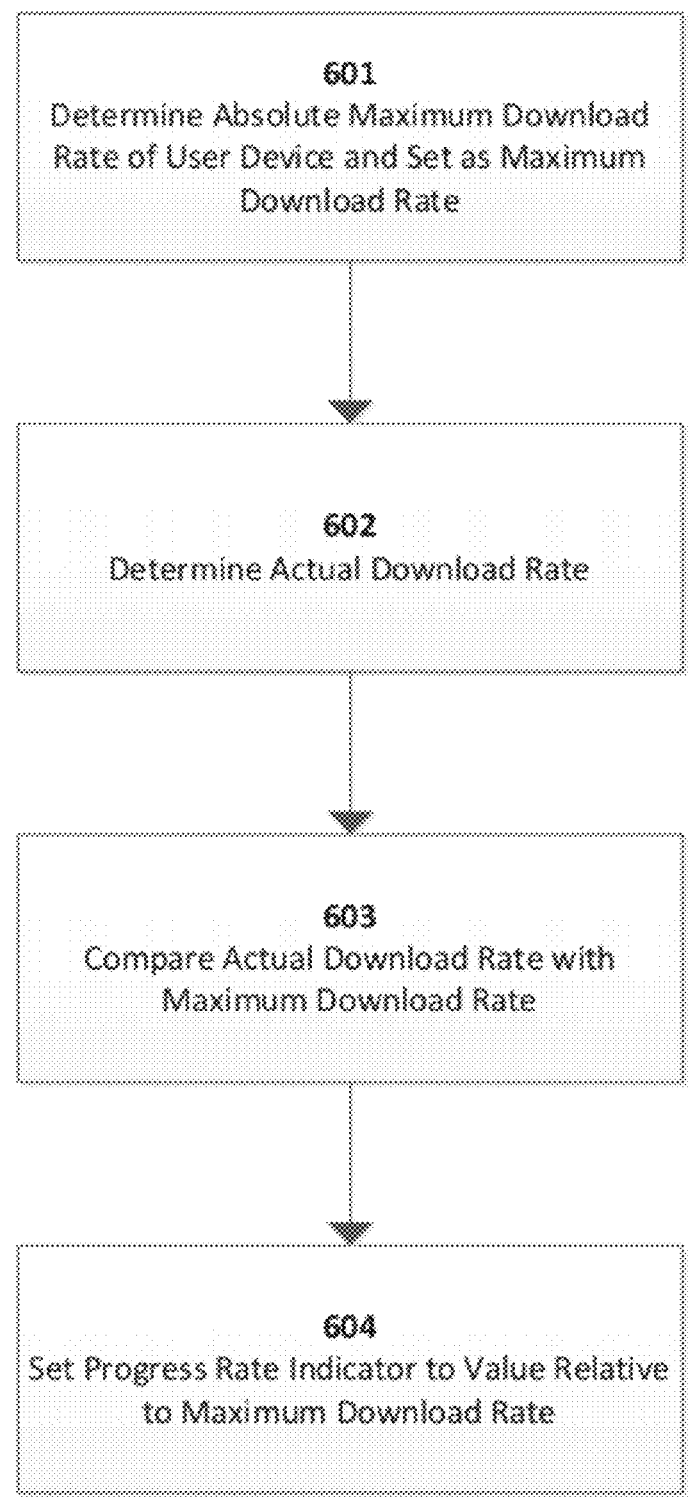
FIG. 6: is an example of a method for setting the maximum progress rate according to an embodiment of the present invention.

Embodiments of the invention may set the maximum download rate of the user device based on one of two exemplary methods. Firstly, as illustrated in FIG. 6, the absolute maximum download rate of the user device is determined at step 601. By this, it is meant that the absolute maximum rate that the user device hardware is capable of is determined, this being a static value. This can be achieved by using a maximum value based on typical or previously measured system performance, such as performing appropriate tests on the hardware. For example, it may be determined that the user device is capable of downloading, from an appropriate source, at a rate of 2 MB/s. At step 602 the current, or instantaneous, download rate of the present download activity is determined. The present download rate and maximum download rate are then compared at step 603 to determine the proportion of the current download rate in relation to the maximum download rate. The progress rate indicator is then set, at step 604, to display a value indicative of the present download rate relative to the maximum download rate. For example, the present download rate may be determined to be 0.5 MB/s, and the progress rate indicator is therefore set to display a value or indication that the download rate is 25%, or ¼ of the maximum download rate.

Figure 7:
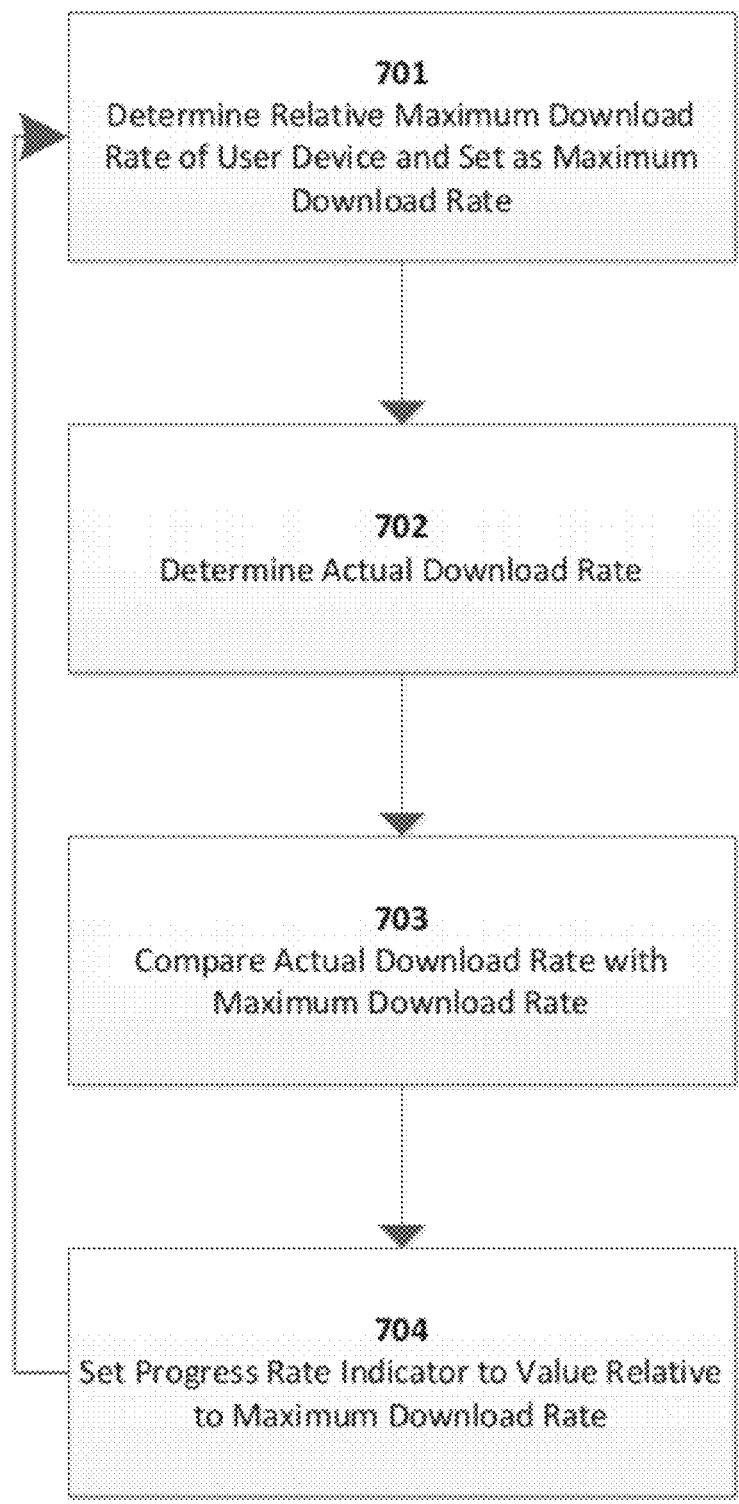
FIG. 7: is a further example of a method for setting the maximum progress rate according to an embodiment of the present invention.

A second manner of setting the maximum download rate of the user device is illustrated in FIG. 7. At step 704 the relative maximum download rate of the user device is determined. By this, it is meant that the maximum download rate that the user device has achieved over a predetermined period is determined, and taken to be the maximum download speed. The predetermined period may be the period for which the user device has been operational, or it may be, for example, the period for which the download has been occurring. Once the maximum download rate value has been determined, the method proceeds in a similar manner to that discussed in relation to FIG. 6, with the actual current download rate being determined at step 702 and a comparison being performed between the actual download rate and the maximum download rate at step 703. This allows the user device to determine the current download rate relative to the maximum download rate, allowing the progress rate indicator to be set to a value relative to the maximum download rate, at step 704, and thus give an indication of the quality/speed of the current download rate relative to the maximum download rate. In addition, the method may optionally include the step of continuously, or periodically, determining the relative maximum and setting the maximum download rate to the highest determined value. In this way, the maximum download rate is dynamically ranged against the maximum download rate of the desired period of time, such as the current download. For example, the fastest rate the current download has gone to the current point in time may be 200 KB/s, but the absolute maximum may be 2 MB/s. 200 KB/s becomes the maximum download rate until, at some point in the future of the current download, the rate increases to 500 KB/s, at which point this value is set as the maximum. The actual download rate is continuously or periodically monitored and the progress rate indicator is set accordingly, depending on the current download rate and current maximum download rate.

The progress rate indicator indicates the rate at which the current activity, a download in this case, is proceeding. In conjunction with the progress indicator the user is informed of how far the download has progressed, and at what rate, relative to the maximum possible rate, the download is proceeding. This means that the user has an indication as to how well their system is performing in the activity.

The progress rate indicator may take the form of any suitable visual indicator, and may, in some embodiments, be a number or value varied between a minimum and maximum value, the maximum value being the maximum download rate. However, in a preferred embodiment the progress rate indicator is dynamically colored depending on the ongoing download speed. In particular, the color may change between a first color and a second color in response to the download rate. The first color may represent a minimum rate, with the second color representing a maximum rate. The color may change between these two colors, or further colors may also be provided between the maximum and minimum colors, to indicate the download rate value relative to the maximum.

As an example, the color red may be used to indicate a minimum speed of 0KB/s, and the color green may be used to represent a maximum speed of 1 MB/s (either because this is the absolute maximum or the relative maximum as described above). If a user is downloading a file, such as a movie, from the internet and the speed of download continues at 1 MB/s, then the progress rate indicator will be colored green, indicating the highest download rate relative to the maximum. If the download speed starts to slow down, the color of the progress rate indicator starts to change in response. If the speed drops to 750 KB/s, the indicator may change to a green/yellow mix, at 500 KB/s yellow, at 250 KB/s a red/yellow mix and at or close to 0 KB/s red, or almost completely red. Of course this is just an example, and different colors may be used.

The color change of the progress rate indicator in response to the download rate changes can be implemented as a smooth mixing. In this way, the color of the progress rate indicator varies continuously between the minimum and maximum colors (and any intervening colors), the mix of colors being interpolated across the whole of the download spectrum such that the progress rate indicator would gradually change color between, for example, green and red. The ratio of one color to another in the color mixture is dependent upon the download rate and the maximum download rate.

Alternatively, the color change of the progress rate indicator in response to download rate changes may be divided into discrete steps. A predetermined number of discrete colors are used, each one representing a predetermined range of download speeds in relation to the maximum value. For example, red may represent a download rate of 0-25% of maximum, orange 25%-50%, yellow 50%-75% and green 75%-100%.

Colors are preferable to represent the download rate since they can be understood intuitively without needing to understand any displayed numbers or know the maximum download rate of the system. Of course other visual indicators could be used for the progress rate indicator, such as patterns, with a pattern of crosses indicating a poor rate, dots a good rate and stripes an intermediate rate. Alternatively the absence of a color or pattern may indicate a good rate, with the indicator becoming colored or patterned to a greater degree as the download rate decreases (or vice versa).

In other embodiments the progress rate indicator may be a simple figure scaled from, for example, 0-10, with 10 being a maximum rate and 0 being the minimum rate. Of course, any suitable minimum and maximum values may be used for display.

Although the progress indicator and the progress rate indicator may be separate items, displayed simultaneously but in separate portions of the screen, it is strongly preferred that the progress rate indicator is overlaid on the progress indicator. This may be achieved by making the progress rate indicator and the progress indicator integral with one another, and particularly with the progress rate indicator being a visual property of the progress indicator. This is illustrated in FIGS. 2-4. The progress indicator is in the form of a progress bar 201. As the download progresses the bar is filled in with a portion 202 having a different visual appearance, such as a different shading or color, to the rest of the bar. Because this portion is visible on the progress indicator it can be consider "overlaid" on the progress indicator. The amount of the bar that is colored indicates the amount of the download that has completed as described above. The color of this portion may, according to embodiments of the invention, be used as the progress rate indicator as discussed above. As shown in FIG. 3, the rate of download changes, resulting in the progress rate indicator 302 changing color from that displayed in FIG. 2. Likewise, the rate changes again to FIG. 4.

Other arrangements are possible, such as the progress rate indicator being a fixed size shape of varying color. Alternatively, the progress rate indicator may be represented in the unfilled portion of the progress bar, with this portion changing color, the portion that is filled to indicate progress being a fixed color.

Although a rate bar has been described as the preferred format for the progress indicator, it will be appreciated that other forms for the progress indicator could be used. For example, the progress indicator could be annular.

The rate of download represented by the progress rate indicator is preferably the instantaneous download rate or the average download rate over a particular recent period. The user device may continuously receive the rate information such that the displayed rate indicator is continuously updated, or it may be done periodically, such as, for example, every 5-10 seconds.

Embodiments of the invention may include a user device configured to perform the methods described above. Such a user device may include an input for downloaded data, an input for receiving current download rate data and an input for receiving data indicative of the maximum download rate. Alternatively, the user device may be configured to determine the current and maximum download rates using an internal processor, based on the received downloaded data and/or the user device specifications. The user device also includes an output for outputting the progress indicator and progress rate indicator to a display such as a screen or television. A processor or CPU is provided for comparing the rate value with a value indicative of the maximum progress rate/download rate so as to determine the correct parameter to apply to the progress rate indicator for display to the user.

Embodiments of the invention find particular utility in user devices such as set-top-boxes for receiving and encoding media content for display, computers, mobile phones, PDAs, tablets and any other user device that may need to display a progress bar for an activity having a variable rate, such as internet downloads.

Although examples have been described in relation to downloading content or data, the invention may be applied to any activity with a variable rate, such as uploads, progress through a television show or film (with different fast forward/rewind rates being available to the user) and so forth.

For the avoidance of doubt, the invention may be embodied in a computer program arranged to carry out any of the methods discussed herein on a suitable computer or any suitable user device, particularly a STB.

The invention claimed is:

1. A method for displaying the progress of an activity performed on a user device, the method comprising:
  outputting a progress indicator indicative of the progress made in completing the activity, and updating the progress indicator as the activity proceeds;
  simultaneously outputting a progress rate indicator having a property indicative of an activity progress rate corresponding to a rate at which the activity is being progressed with respect to a current maximum progress rate, the outputting the progress rate indicator comprising:
  dynamically updating the progress rate indicator based on dynamically updating the current maximum progress rate at least in part by:
    receiving a first rate value indicative of the activity progress rate;
    generating a first fractional rate value of the first rate value with a first value indicative of a first maximum progress rate of the user device for the activity;
    generating a first indicator corresponding to the property based on the first fractional rate value generated;
    after generating the first indicator:
      receiving a second rate value indicative of the activity progress rate, where the second rate value is different from the first rate value;
      generating a second fractional rate value of the second rate value with a second value indicative of a second maximum progress rate of the user device for the activity, where the second fractional rate value is different from the first fractional rate value, and the second maximum progress rate is different from the first maximum progress rate; and
      generating a second indicator corresponding to the property based on the second fractional rate value generated, where the second indicator is different from the first indicator.

2. The method according to claim 1, further comprising displaying one or more further updated progress rate indicators, subsequent to the second indicator.

3. The method according to claim 1, wherein the first maximum progress rate or the second maximum progress rate has a maximum progress rate value that is a highest rate value received during the activity.

4. The method according to claim 3, wherein the maximum progress rate value is updated when a higher rate value than the previous highest rate value is received.

5. The method according to claim 1, wherein the first maximum progress rate or the second maximum progress rate or the second maximum progress rate has a maximum progress rate value is determined by:
  receiving a value indicative of a maximum potential progress rate of the user device for the activity and setting the maximum progress rate value to the value received.

6. The method according to claim 1, wherein the first indicator is overlaid on the progress indicator.

7. The method according to claim 1, wherein a progress rate is indicated by visual means such as a plurality of colors or patterns.

8. The method according to claim 7, wherein the progress rate is indicated by a color of the progress rate indicator, and wherein a first color indicating a minimum progress rate and a second color indicating a maximum progress rate.

9. The method according to claim 8, wherein the color of the progress rate indicator varies continuously between the first color and the second color in response to a received rate value.

10. The method according to claim 8, wherein a progress rate range is divided into discrete steps, and wherein a different color is used to indicate each step.

11. The method according to claim 1, wherein the progress rate indicator is a visual property of at least a portion of the progress indicator.

12. The method according to claim 1, wherein the activity is downloading data from a network and uploading the data to the network.

13. The method of claim 1, wherein the user device is configured to output the progress indicator and the first indicator to a display.

14. The method of claim 12, wherein the user device is comprised in a set-top-box.

15. A non-transitory, computer-readable medium having sets of instructions stored thereon which, when executed by a computer, cause the computer to:
  output a progress indicator indicative of the progress made in completing an activity, and updating the progress indicator as the activity proceeds;
  simultaneously output a progress rate indicator having a property indicative of an activity progress rate corresponding to a rate at which the activity is being progressed with respect to a current maximum progress rate, the outputting the progress rate indicator comprising:
  dynamically update the progress rate indicator based on dynamically updating the current maximum progress rate at least in part by:
    receiving a first rate value indicative of the activity progress rate;
    generating a first fractional rate value of the first rate value with a first value indicative of a first maximum progress rate of a user device for the activity;
    generating a first indicator corresponding to the property based on the first fractional rate value generated;
    after generating the first indicator:
      receiving a second rate value indicative of the activity progress rate, where the second rate value is different from the first rate value;
      generating a second fractional rate value of the second rate value with a second value indicative of a second maximum progress rate of the user device for the activity, where the second fractional rate value is different from the first fractional rate value, and the second maximum progress rate is different from the first maximum progress rate; and generating a second indicator corresponding to the property based on the second fractional rate value generated, where the second indicator is different from the first indicator.

16. The non-transitory, computer-readable medium according to claim 15, wherein the first maximum progress rate or the second maximum progress rate has a maximum progress rate value that is a highest rate value received during the activity.

17. The non-transitory, computer-readable medium according to claim 15, wherein the first maximum progress rate or the second maximum progress rate has a maximum progress rate value that is updated when a higher rate value than a previous highest rate value is received.

18. The non-transitory, computer-readable medium according to claim 15, wherein the first indicator is overlaid on the progress indicator.

19. A system for displaying the progress of an activity performed on a user device, the system comprising:

a memory device; and a processor in communication with the memory device, wherein the memory device has sets of instructions stored thereon which, when executed by the processor, cause the processor to:

output a progress indicator indicative of the progress made in completing the activity, and updating the progress indicator as the activity proceeds;

simultaneously output a progress rate indicator having a property indicative of an activity progress rate corresponding to a rate at which the activity is being progressed with respect to a current maximum progress rate, the outputting the progress rate indicator comprising:

dynamically update the progress rate indicator based on dynamically updating the current maximum progress rate at least in part by:

receiving a first rate value indicative of the activity progress rate; and generating a first fractional rate value of the first rate value with a value indicative of a first maximum progress rate of the user device for the activity;

generating a first indicator corresponding to the property based on the first fractional rate value generated;

after generating the first indicator:

receiving a second rate value indicative of the activity progress rate, where the second rate value is different from the first rate value;

generating a second fractional rate value of the second rate value with a second value indicative of a second maximum progress rate of the user device for the activity, where the second fractional rate value is different from the first fractional rate value, and the second maximum progress rate is different from the first maximum progress rate; and generating a second indicator corresponding to the property based on the second fractional rate value generated, where the second indicator is different from the first indicator.

* * * * *